United States Patent
Qi et al.

(10) Patent No.: US 10,406,940 B2
(45) Date of Patent: Sep. 10, 2019

(54) METHOD AND APPARATUS FOR CONTROLLING A VEHICLE SEAT

(71) Applicant: GM Global Technology Operations LLC, Detroit, MI (US)

(72) Inventors: Jimmy Qi, Shanghai (CN); Jiang Du, Beaverton, OR (US); Peggy Wang, Shanghai (CN); Richard Liu, Shanghai (CN); Jian Wu, Shanghai (CN); Xiaowen Dai, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 93 days.

(21) Appl. No.: 15/726,096

(22) Filed: Oct. 5, 2017

(65) Prior Publication Data
US 2019/0106020 A1   Apr. 11, 2019

(51) Int. Cl.
| | | |
|---|---|---|
| *B60N 2/02* | (2006.01) | |
| *B60Q 9/00* | (2006.01) | |
| *B60W 50/16* | (2012.01) | |
| *B60N 2/90* | (2018.01) | |
| *B60W 50/14* | (2012.01) | |

(52) U.S. Cl.
CPC ............ *B60N 2/0276* (2013.01); *B60Q 9/008* (2013.01); *B60W 50/16* (2013.01); *B60N 2002/981* (2018.02); *B60W 2050/143* (2013.01)

(58) Field of Classification Search
CPC ............ B60N 2/0276; B60N 2002/981; B60Q 9/008; B60W 50/16; B60W 2050/143
See application file for complete search history.

(56) References Cited

U.S. PATENT DOCUMENTS

| 6,019,428 | A * | 2/2000 | Coffield | A47C 7/46 297/284.9 |
|---|---|---|---|---|
| 6,516,258 | B1 * | 2/2003 | Herrmann | B60R 21/013 180/232 |
| 6,937,165 | B2 * | 8/2005 | Rogers | G08G 1/167 340/961 |
| 10,059,261 | B2 * | 8/2018 | Wu | B60R 21/0134 |
| 2003/0025601 | A1 * | 2/2003 | Gruteser | A47C 15/004 340/540 |
| 2007/0235297 | A1 * | 10/2007 | Stoschek | B60N 2/0228 200/5 R |
| 2011/0018740 | A1 * | 1/2011 | Boren | G08B 6/00 340/965 |
| 2012/0226418 | A1 * | 9/2012 | Veen | B60N 2/0232 701/49 |
| 2013/0311641 | A1 * | 11/2013 | Chow | G08G 1/04 709/224 |

(Continued)

*Primary Examiner* — Thomas Ingram
(74) *Attorney, Agent, or Firm* — Quinn IP Law

(57) ABSTRACT

A vehicle is described, and includes a telematics device, a GPS tracking device, and a multi-position driver's seat including a seat position actuator that is operatively connected to a seat controller and disposed to control a position setting thereof. A control system and method for the vehicle is described and includes receiving an alert of an impending traffic event, and determining a desired activation command for the seat position actuator based upon the impending traffic event. The seat controller controls the seat position actuator responsive to the desired activation command.

20 Claims, 2 Drawing Sheets

(56) References Cited

U.S. PATENT DOCUMENTS

| | | | |
|---|---|---|---|
| 2013/0342366 A1* | 12/2013 | Kiefer | G08B 6/00 340/901 |
| 2016/0107570 A1* | 4/2016 | Modarres | B60Q 9/008 340/435 |
| 2016/0129920 A1* | 5/2016 | Hall | B60W 50/16 701/1 |

* cited by examiner

METHOD AND APPARATUS FOR CONTROLLING A VEHICLE SEAT

INTRODUCTION

Vehicles can include vehicle-to-vehicle communications and vehicle-to-infrastructure communications capability, which can be employed to notify an operator of an impending traffic event.

SUMMARY

A vehicle is described, and includes a telematics device, a GPS tracking device, and a multi-position driver's seat including a seat position actuator that is operatively connected to a seat controller and disposed to control a position setting thereof. A control system and method for the vehicle is described and includes receiving an alert of an impending traffic event, and determining a desired activation command for the seat position actuator based upon the impending traffic event. The seat controller controls the seat position actuator responsive to the desired activation command.

An aspect of the disclosure includes the desired activation command for the seat position actuator being a periodic waveform having repetitively executed commands each defined by a magnitude, a hardness, a pitch and a duration.

Another aspect of the disclosure includes the periodic waveform having repetitively executed commands each defined by magnitude, hardness, pitch and duration being selected to haptically simulate a desired road surface at the driver's seat.

Another aspect of the disclosure includes the desired road surface at the driver's seat being a plurality of rumble strips.

Another aspect of the disclosure includes the periodic waveform having repetitively-executed commands each defined by magnitude, hardness, pitch and duration being selected to induce a vibration in the driver's seat that simulates a plurality of rumble strips.

Another aspect of the disclosure includes the seat position actuator being a first actuator disposed to adjust a longitudinal position of the driver's seat.

Another aspect of the disclosure includes the seat position actuator being a second actuator disposed to adjust an elevation position of the driver's seat.

Another aspect of the disclosure includes the seat position actuator being a third actuator disposed to adjust a rotational position of a seat back relative to a lower seat member of the driver's seat.

Another aspect of the disclosure includes the seat position actuator being a fourth actuator disposed to adjust a rotational position of the driver's seat relative to a floor pan of the vehicle.

Another aspect of the disclosure includes the seat position actuator being a fifth actuator disposed to adjust a lumbar support position of the driver's seat.

Another aspect of the disclosure includes the seat position actuator being a combination of a first actuator disposed to adjust a longitudinal position of the driver's seat, a second actuator disposed to adjust an elevation position of the driver's seat, a third actuator disposed to adjust a rotational position of a seat back relative to a lower seat member of the driver's seat, a fourth actuator disposed to adjust a rotational position of the driver's seat relative to a floor pan of the vehicle and a fifth actuator disposed to adjust a lumbar support position of the driver's seat.

Another aspect of the disclosure includes the telematics device being disposed to effect one of vehicle-to-vehicle (V2V) communication and vehicle-to-infrastructure (V2I) communication, wherein receiving the alert of the impending event is communicated to the vehicle via one of the V2V and the V2I communications.

Another aspect of the disclosure includes the alert of an impending event being received prior to actual perception by the driver.

Another aspect of the disclosure includes the vehicle including an on-vehicle spatial sensor, wherein receiving the alert of the impending traffic event includes receiving the alert via the on-vehicle spatial sensing device.

Another aspect of the disclosure includes the vehicle including an HMI device in communication with an auditory speaker, and further includes generating, via the auditory speaker, an audible sound that is analogous to the desired activation command for the driver's seat.

Another aspect of the disclosure includes communicating a detail associated with the impending traffic event via the HMI device.

Another aspect of the disclosure includes monitoring ground speed of the vehicle and repeating the controlled activation of the seat actuators when there is no discernible reduction in the ground speed of the vehicle.

Another aspect of the disclosure includes the intensity of the periodic waveform increasing with closer proximity to the traffic event.

Another aspect of the disclosure includes the factors associated with the controlled activation of the seat actuators being dependent upon the type of traffic event.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

The appended drawings are not necessarily to scale, and present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, technical material that is understood in the related art has not been described in detail in order to avoid unnecessarily obscuring the disclosure. Furthermore, the disclosure, as illustrated and described herein, may be practiced in the absence of an element that is not specifically disclosed herein.

Figure 1:
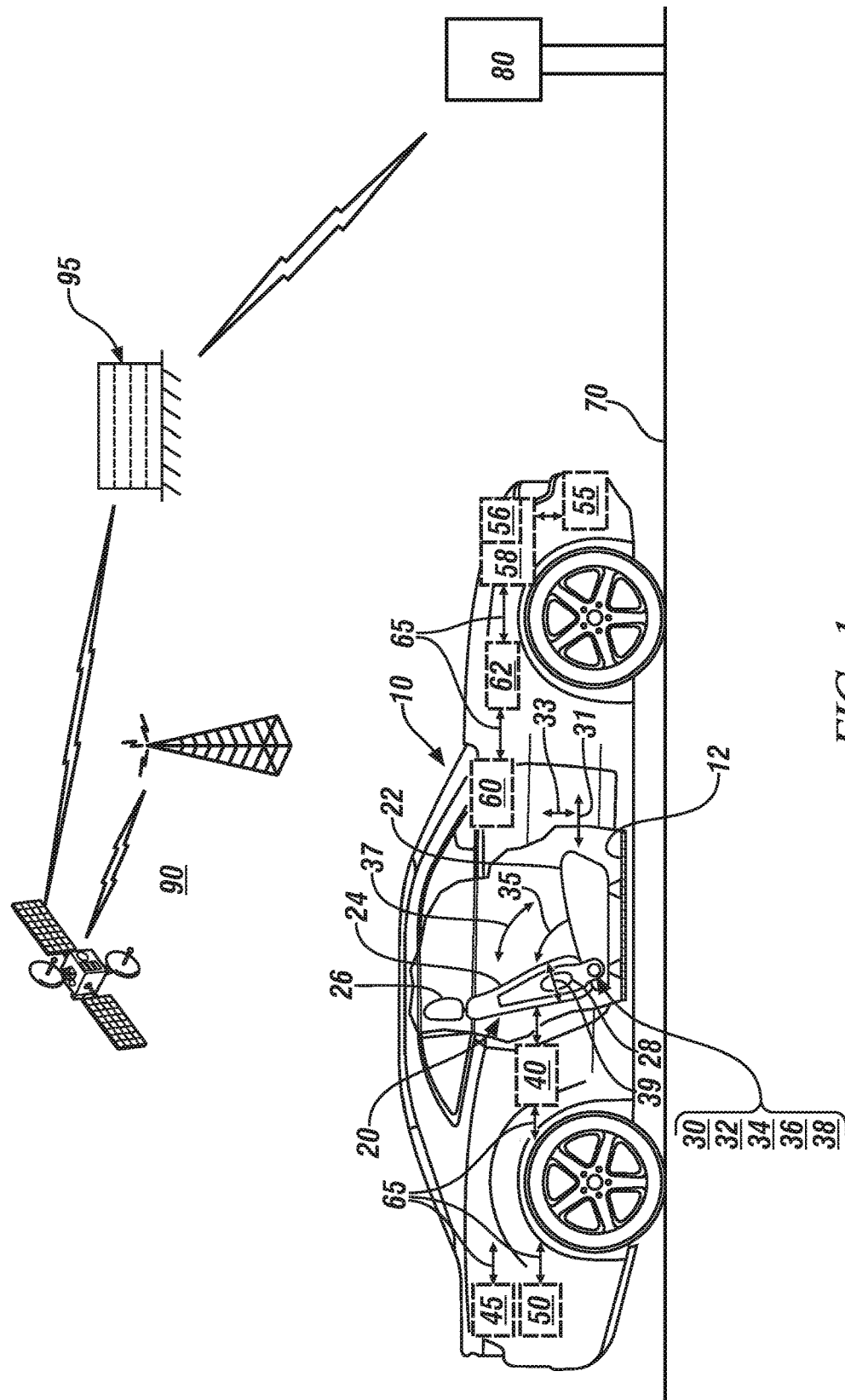
FIG. 1 schematically shows a side-view of a vehicle disposed on a road surface and including a controllable multi-position driver's seat, a plurality of spatial monitoring sensors, a telematics device and a GPS tracking device, in accordance with the disclosure.

Referring to the drawings, wherein like reference numerals correspond to like or similar components throughout the several Figures, FIG. 1, consistent with embodiments disclosed herein, illustrates a side-view of a vehicle 10 that is disposed on a road surface 70 and including a multi-position driver's seat 20, a telematics device 45 and a GPS tracking device 50. In one non-limiting application, the vehicle 10 includes a plurality of spatial sensors 55. The vehicle 10 includes, in one embodiment, a four-wheel passenger vehicle with steerable front wheels and fixed rear wheels. The vehicle 10 may include, by way of non-limiting examples, a passenger vehicle, a light-duty or heavy-duty truck, a utility vehicle, an agricultural vehicle, an industrial/warehouse vehicle, or a recreational off-road vehicle.

The multi-position driver's seat 20 is disposed on a floor pan 12 of the vehicle 10, and includes a lower member 22, a seat back 24 and a head rest 26. Although not shown, the lower member 22, the seat back 24 and the head rest 26 are each formed by a foam body mounted on a frame and covered with a fabric cover. The multi-position driver's seat 20 is configured to include a plurality of seat actuators that are disposed to adjustably control positions of the lower member 22 and the seat back 24. The seat actuators include a first actuator 30, which is disposed to longitudinally adjust the seat 20 relative to the floor pan 12. The longitudinal adjustment indicated by arrow 31. The actuators include a second actuator 32, which is disposed to adjust elevation of the seat 20 relative to the floor pan 12. The elevation adjustment is indicated by arrow 33. The actuators include a third actuator 34, which is disposed to adjust rotation of seat back 24 relative to the lower seat member 22. This rotation is indicated by arrow 35. The actuators include a fourth actuator 36, which is disposed to adjust rotation of the seat 20 relative to the floor pan 12. This rotation is indicated by arrow 37. The actuators include a fifth actuator 38, which is disposed to adjust projection of a lumbar support device 28. This projection is indicated by arrow 39. Each of the seat actuators is operatively connected to a seat controller 40, which is in communication with an interface device that enables a vehicle operator to adjust various positions of the multi-position driver's seat 20 according to their preference.

The telematics device 45 includes a wireless telematics communication system capable of extra-vehicle communications, including communicating with a communication network 90 having wireless and wired communication capabilities. The telematics device 45 is capable of extra-vehicle communications (V2X) that includes short-range vehicle-to-vehicle (V2V) communication and vehicle-to-infrastructure communication (V2I). Alternatively or in addition, the telematics device 45 has a wireless telematics communication system capable of short-range wireless communication to a handheld device, e.g., a cell phone, a satellite phone or another telephonic device. In one embodiment the handheld device is loaded with a software application that includes a wireless protocol to communicate with the telematics controller, and the handheld device executes the extra-vehicle communication, including communicating with an off-board controller 95 via the communication network 90. In one embodiment, the handheld device can be associated with a vehicle service center. Alternatively or in addition, the telematics device 45 can execute extra-vehicle communication directly by communicating with the off-board controller 95 via the communication network 90.

The vehicle 10 includes a human/machine interface (HMI) system 60 that provides for human/machine interaction for purposes of directing operation of on-vehicle systems such as an infotainment system, the GPS tracking device 50, a navigation system and the like. The HMI system 60 includes an HMI controller 62. The HMI controller 62 monitors operator requests and provides information to the operator including status of vehicle systems, service and maintenance information. The HMI controller 62 can also include a global positioning/navigation system that employs the GPS tracking device 50. The HMI controller 62 communicates with and/or controls operation of a plurality of operator interface devices, wherein the operator interface devices are capable of transmitting a message associated with operation of one of the vehicle control systems. The HMI controller 62 may also communicate with one or a plurality of devices that monitor biometric data associated with the vehicle operator, including, e.g., eye gaze location, posture, and head position tracking, among others. The HMI controller 62 is depicted as a unitary device for ease of description, but may be configured as a plurality of controllers and associated sensing devices in an embodiment of the system described herein. Operator interface devices can include devices that are capable of transmitting a message urging operator action, and can include an electronic visual display module, e.g., a liquid crystal display (LCD) device, a heads-up display (HUD), an audio device, a wearable device, etc. The audio device may be integrated into the infotainment system. The operator interface devices that are capable of urging operator action are preferably controlled by or through the HMI controller 62. The HUD may project information that is reflected onto an interior side of a windshield of the vehicle, in the field of view of the operator, including transmitting a confidence level associated with operating one of the vehicle control systems. The HUD may also provide augmented reality information, such as lane location, vehicle trajectory, directional and/or navigational information, and the like.

In one embodiment, the vehicle 10 is configured to communicate with the communication network 90, including being configured to communicate with an intelligent highway system, such as may be disposed in controller 95. The intelligent highway system may be configured with a multiplicity of highway sensing devices 80, one of which is illustrated. The highway sensing devices 80 are elements of a network that is involved in V2I communication. Each of the highway sensing devices 80 can be disposed at or near a roadway and include sensors and associated control routines that enable it to monitor locations, speeds and trajectories of vehicles operating or otherwise disposed on a highway. This can include communicating a geographic location, a forward velocity, a trajectory and an acceleration rate of one or more vehicles in relation to the vehicle 10. This can also include communicating speed limits, traffic, road surface conditions and other pertinent information to the vehicle 10. Such information can be also communicated to other similarly-situated vehicles. In one embodiment, the vehicle 10 is configured to communicate with the off-board controller 95 via the communication network 90. The highway sensing devices 80 are disposed to monitor the roadway and detect conditions that can indicate formation or occurrence of an impending traffic event that is on or near the roadway. The highway sensing devices 80 can communicate with the off-board controller 95 via the communication network 90 and also communicate directly with the vehicles on the roadway, including the vehicle 10. Impending traffic events can include, by way of example, presence of a pedestrian, bicycle or other slow moving vehicle on or near the roadway, presence of an accident on or near the roadway, presence of a disabled vehicle on or near the roadway, presence of a slow moving vehicle such as a construction or agricultural vehicle on or near the roadway, presence of a vehicle conveying an oversized load on or near the roadway, etc.

The spatial sensors 55 are elements of a vehicle spatial monitoring system that also includes a spatial monitoring controller 58 and a perception module 56. Each of the spatial sensors 55 is disposed on-vehicle to monitor a field of view of objects and geographic regions that are proximal to the vehicle 10. The spatial monitoring controller 58 generates digital representations of each of the fields of view including proximate remote objects based upon data inputs from the spatial sensors. The spatial monitoring controller 58 can evaluate inputs from the spatial sensors 55 to determine a linear range, relative speed, and trajectory of the vehicle 10 in view of each proximate remote object. The spatial sensors 55 can be located at various locations on the vehicle 10, including the front corners, rear corners, rear sides and mid-sides. The spatial sensors 55 can include a front radar sensor and a camera in one embodiment, although the disclosure is not so limited. Placement of the aforementioned spatial sensors 55 permits the spatial monitoring controller 58 to monitor traffic flow including proximate vehicles and other objects around the vehicle 10. Data generated by the spatial monitoring controller 58 may be employed by a lane mark detection processor (not shown) to estimate the roadway. The spatial sensors 55 can further include object-locating sensing devices including range sensors, such as FM-CW (Frequency Modulated Continuous Wave) radars, pulse and FSK (Frequency Shift Keying) radars, and Lidar (Light Detection and Ranging) devices, and ultrasonic devices which rely upon effects such as Doppler-effect measurements to locate forward objects. The possible object-locating devices include charged-coupled devices (CCD) or complementary metal oxide semi-conductor (CMOS) video image sensors, and other camera/video image processors that utilize digital photographic methods to 'view' forward objects including one or more vehicle(s). Such sensing systems are employed for detecting and locating objects in automotive applications and are useable with systems including, e.g., adaptive cruise control, autonomous braking, autonomous steering and side-object detection.

The spatial sensors 55 are preferably positioned within the vehicle 10 in relatively unobstructed positions to monitor the spatial environment. As employed herein, the spatial environment includes external elements, including fixed objects such as signs, poles, trees, houses, stores, bridges, etc.; and, moving or moveable objects such as pedestrians and other vehicles. Each of these spatial sensors 55 provides an estimate of actual location or condition of an object, wherein said estimate includes an estimated position and standard deviation. As such, sensory detection and measurement of object locations and conditions are typically referred to as 'estimates.' It is further appreciated that the characteristics of these spatial sensors 55 are complementary, in that some are more reliable in estimating certain parameters than others. The spatial sensors 55 can have different operating ranges and angular coverages capable of estimating different parameters within their operating ranges. For example, radar sensors can usually estimate range, range rate and azimuth location of an object, but are not normally robust in estimating the extent of a detected object. A camera with vision processor is more robust in estimating a shape and azimuth position of the object, but is less efficient at estimating the range and range rate of an object. Scanning type lidar sensors perform efficiently and accurately with respect to estimating range, and azimuth position, but typically cannot estimate range rate, and are therefore not as accurate with respect to new object acquisition/recognition. Ultrasonic sensors are capable of estimating range but are generally incapable of estimating or computing range rate and azimuth position. Further, it is appreciated that the performance of each sensor technology is affected by differing environmental conditions. Thus, some of the spatial sensors 55 present parametric variances during operation, although overlapping coverage areas of the sensors create opportunities for sensor data fusion.

The perception module 56 is configured to monitor vehicle position, vehicle dynamic states and the spatial environment proximal to the vehicle 10. The perception module 56 is disposed on-vehicle to monitor and characterize the spatial environment proximal to the vehicle 10, which may be provided to the vehicle systems and associated controllers of the vehicle control system to provide a level of driving automation. Data and signal inputs to the perception module 56 include spatial environment data in the form of inputs from the spatial sensors 55, which include cameras, radars, lidars, etc. Data inputs to the perception module 56 further include map date in the form of a detailed 3D map of the surrounding environment and position and trajectory data from the GPS tracking device 50. Data inputs to the perception module 56 further includes vehicle dynamic data in the form of data collected from in-vehicle sensors such as gyros and wheel speed sensors. Data inputs to the perception module 56 further includes the extra-vehicle communications (V2X) that includes short-range vehicle-to-vehicle (V2V) communication, vehicle-to-infrastructure communication (V2I) and vehicle-to-pedestrian communication (V2P).

The perception module 56 includes localization, object detection, and classification algorithms to estimate the position of the current road, the current traffic lane, the types and position of objects and obstacles, including both static and dynamic obstacles and objects. The perception module 56 can estimate motion and behavior of the surrounding moving obstacles on the road and on the traffic lane. The perception module 56 also monitors and estimates vehicle position and dynamic states, as described herein. The vehicle position states include geographically defined x- and y-states (e.g., latitude and longitude), and an angular heading. The vehicle dynamic states include yaw, lateral acceleration and longitudinal acceleration states.

The term "controller" and related terms such as control module, module, control, control unit, processor and similar terms refer to one or various combinations of Application Specific Integrated Circuit(s) (ASIC), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine-readable instructions in the form of one or more software or firmware programs or routines, combinational logic circuit(s), input/ output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. The term 'model' refers to a processor-based or processor-executable code and associated calibration that simulates a physical existence of a device or a physical process. The terms 'dynamic' and 'dynamically' describe steps or processes that are executed in real-time and are characterized by monitoring or otherwise determining states of parameters and regularly or periodically updating the states of the parameters during execution of a routine or between iterations of execution of the routine. The terms "calibration", "calibrate", and related terms refer to a result or a process that compares an actual or standard measurement associated with a device with a perceived or observed measurement or a commanded position. A calibration as described herein can be reduced to a storable parametric table, a plurality of executable equations or another suitable form.

Communication between controllers, and communication between controllers, actuators and/or sensors may be accomplished using a direct wired point-to-point link, a networked communication bus link, a wireless link or another suitable communication link, and is indicated by element 65. Communication includes exchanging data signals in suitable form, including, for example, electrical signals via a conductive medium, electromagnetic signals via air, optical signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

Figure 2:
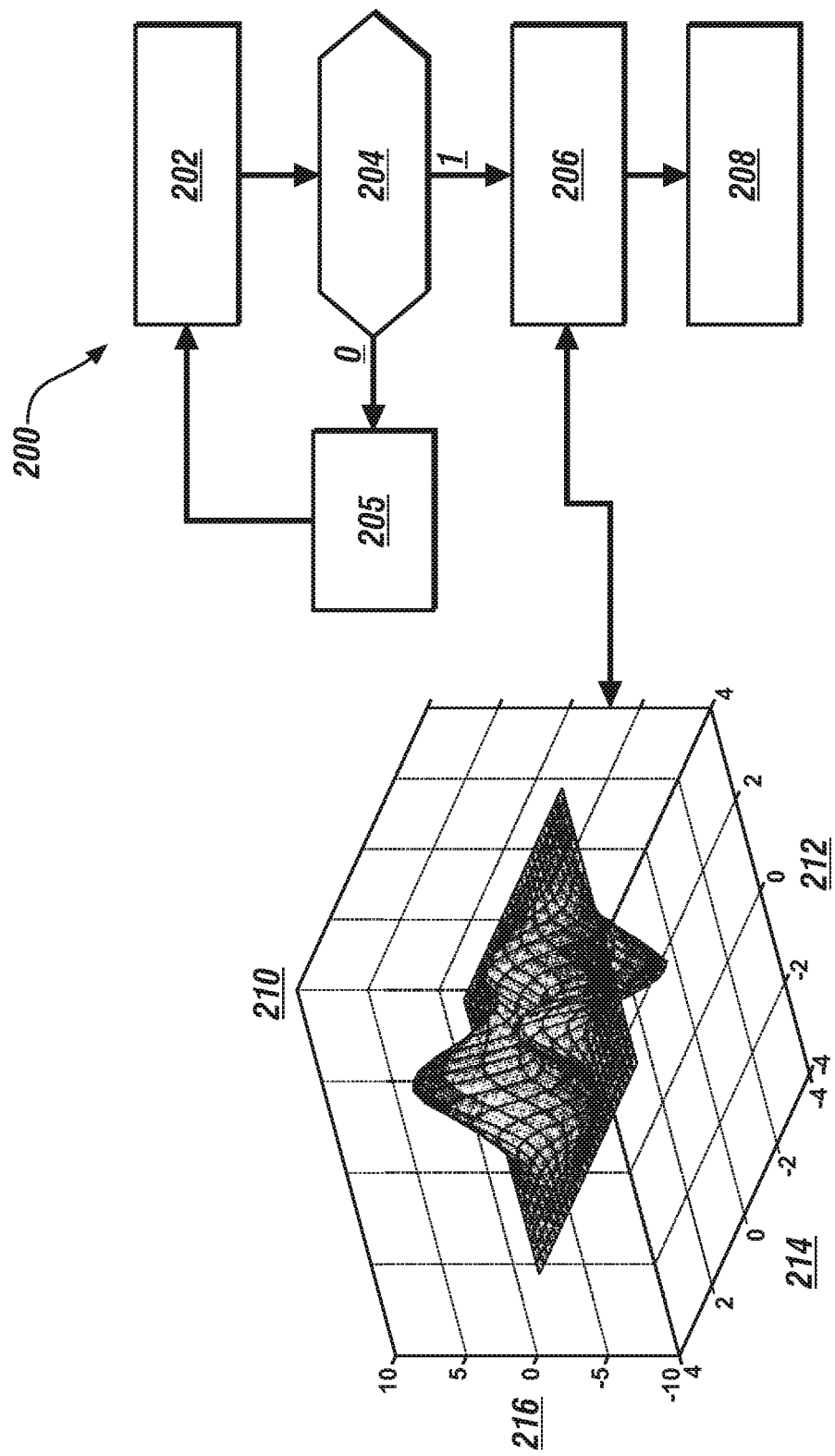
FIG. 2 schematically shows an information flow diagram for a routine for the vehicle that is described with reference to FIG. 1, wherein the routine executes to dynamically alert a vehicle driver of an impending traffic event that may require heightened attentiveness by simulating a speed bump or rumble strip sensation via the driver's seat employing the seat actuators, in accordance with the disclosure.

FIG. 2 provides details related to a method that can be implemented in the vehicle 10 that is described with reference to FIG. 1 to dynamically alert a vehicle driver of an impending traffic event that may require heightened attentiveness. This includes alerting the operator of an impending traffic event prior to actual perception by the driver. The alert mechanism can be in the form of simulating a speed bump or rumble strip sensation via the driver's seat 20 employing the seat actuators, wherein a speed bump or rumble strip includes a series of raised or detented strips on a road surface that have longitudinal axes that are placed orthogonal to the direction of travel. When vehicle tires of a moving vehicle contact the rumble strips, a low-frequency vibration can be transferred via the vehicle suspension system to the driver's seat, alerting the operator of the need for heightened attentiveness.

FIG. 2 schematically shows an information flow diagram associated with an embodiment of the routine 200, which can be advantageously implemented in a controller of an embodiment of the vehicle 10 that is described with reference to FIG. 1. The routine 200 can be executed as one or a plurality of control routines, employing information stored therein or available from other devices either on-vehicle or off-vehicle. Table 1 is provided as a key wherein the numerically labeled blocks and the corresponding functions are set forth as follows, corresponding to the routine 200. The teachings may be described herein in terms of functional and/or logical block components and/or various processing steps. It should be realized that such block components may be composed of hardware, software, and/or firmware components that have been configured to perform the specified functions.

TABLE 1

| BLOCK | BLOCK CONTENTS |
|---|---|
| 202 | Dynamically monitor V2X communications Monitor input from on-vehicle spatial sensors |
| 204 | Alert received? |
| 205 | No action |
| 206 | Determine activation command(s) for seat position actuator(s) |
| 208 | Command activation of seat position actuator(s) |

Execution of the routine 200 for includes as follows, wherein the steps may be executed in a suitable order, and are not limited to the order described with reference to FIG. 2. The routine 200 executes periodically during vehicle operation.

The routine 200 includes dynamically monitoring various extra-vehicle communications (V2X) via the telematics device 45 coincident with monitoring a trajectory of the vehicle 10 via the GPS tracking device 50. The extra-vehicle communications (V2X) includes short-range vehicle-to-vehicle (V2V) communication, vehicle-to-infrastructure communication (V2I) and vehicle-to-pedestrian (V2P) communication, as available. The routine 200 also includes dynamically monitoring inputs from the on-vehicle spatial sensors 55 during vehicle operation (202). Either or both the extra-vehicle communications (V2X) and the spatial sensors 55 can communicate an alert indicating occurrence or presence of an impending traffic event that is in the trajectory of the vehicle 10 that requires heightened attentiveness by the vehicle operator (204). Impending traffic events can include, by way of example, presence of a pedestrian, bicycle or other slow moving vehicle in or near the trajectory of the vehicle 10, presence of an accident in or near the trajectory of the vehicle 10, presence of a disabled vehicle in or near the trajectory of the vehicle 10, presence of a slow moving vehicle such as a construction or agricultural vehicle in or near the trajectory of the vehicle 10, presence of a vehicle conveying an oversized load in or near the trajectory of the vehicle 10, etc.

When there is no alert related to an impending traffic event in the trajectory of the vehicle 10 (204)(0), there is no further action (205), and monitoring continues periodically (202).

When an alert related to an impending traffic event is communicated to the seat controller 40 (204)(1), the seat controller 40 determines seat activation command(s) for one or a plurality of the seat position actuator(s) (206), and then commands activation of seat position actuator(s) based thereon (208).

The seat activation command(s) can include one or a plurality of smart seat control algorithms that automatically adjust seat pitch position and duration to reflect a low-frequency vibration that resembles a physical speed bump or rumble strip effect, with a capability of having a variation in the level or magnitude of notification depending upon the nature of the impending traffic event and the traffic environment.

In one embodiment, the seat activation command(s) for one or a plurality of the seat position actuator(s) can be determined as follows. The alert related to an impending traffic event that is communicated to the seat controller 40 preferably includes data in the form of vehicle speed, travel distance to the impending traffic event and an indication of traffic complexity, such as a congestion level that is determined based upon an entropy determination.

A target function can be determined taking into account driving comfort level (C) and Risk level (R) as follows:

$$E(\theta) = C/R^2. \quad [1]$$

wherein θ defines the weights of configuration components,

C is based upon configuration components, and

R is based upon traffic complexity.

A relation can be developed in the form of a target function, as follows:

$$\underset{\theta}{\operatorname{argmax}} E(\theta) \quad [2]$$

A gradient of E can be calculated in view of θ based upon Eq. 2. The target function can be optimized employing a gradient descent method by learning rate a, including finding an optima or reaching the iteration steps. This can include setting up a configuration of the speed bump that can be mapped to activation command(s) for one or a plurality of the seat position actuator(s) to optimize the seat control. Element 210 graphically shows an example of a target function that can be determined based upon EQS. 1 and 2. The target function includes a measure of intensity shown on axis 216, i.e., magnitude, hardness, pitch and/or duration of seat activation in relation to a magnitude of traffic complexity, shown on axis 212 and a distance/speed to the impending traffic event shown on axis 214. The target function is employed to generate the activation command(s) for one or a plurality of the seat position actuator(s) to optimize the seat control, and is in the form of a periodic waveform that includes a plurality of repetitively executed commands that are defined by the magnitude, hardness, pitch and/or duration. The periodic waveform may be sinusoidal-shaped, triangular-shaped, or another shape.

Furthermore, different risk levels and speed levels can map to different voice and HUD information. The infrastructure systems associated with V2I and I2P can incorporate non-real time information, e.g., map information, which can be utilized to enhance the source for calculating the traffic complexity.

When an alert related to an impending traffic event is communicated to the seat controller 40 (204)(1), the seat controller 40 determines seat activation command(s) for one or a plurality of the seat position actuator(s) (206), and then commands activation of seat position actuator(s) based thereon (208).

The alert related to the impending traffic event may also be communicated to the HMI system 60 and the HMI controller 62 in one embodiment. The HMI system 60 can supplement the seat activation command(s) with visual and/or audible warning signals that alert the vehicle operator via the operator interface devices such as the LCD device, the HUD, the audio device, etc. The operator interface devices can convey a message urging operator action, wherein the message may include a detail associated with the impending traffic event. Examples of a detail that can be associated with the impending traffic event can include, by way of indicating presence of a pedestrian, bicycle, another slow moving vehicle, presence of an accident, presence of a disabled vehicle, presence of a slow moving vehicle such as a construction or agricultural vehicle, presence of a vehicle conveying an oversized load, etc. Furthermore, the HMI system 60 can control brightness, color, blinking frequency and other factors associated with the visual display module and also control sound level of the audio device based upon the nature and proximity of the impending traffic event. In one embodiment, HMI system 60 can command the audio device to generate an audible sound that is analogous to the desired activation command for the driver's seat. As such, when the seat controller 40 commands activation of the seat position actuator(s) to generate a low-frequency vibration that resembles a physical speed bump or rumble strip effect in the vehicle seat 20, the audio device can be controlled to coincidently generate a low-frequency auditory sound that is simulates a physical speed bump or rumble strip effect.

Ground speed of the vehicle 20 is monitored during ongoing operation, and can be communicated to the seat controller 40, which may repeat the controlled activation of the seat actuators when there is no discernible reduction in the ground speed of the vehicle 10 in response to the alert related to the impending traffic event. The repetition of the activation of the seat actuators may increase in intensity, i.e., increase in the magnitude, hardness, pitch and/or duration of the activation as the vehicle 10 attains closer proximity to the traffic event. Furthermore, the repetition of the activation of the seat actuators may increase in intensity, i.e., increase in the magnitude, hardness, pitch and/or duration of the activation when there is no discernible reduction in the ground speed of the vehicle 10 as the vehicle 10 attains closer proximity to the traffic event.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by special-purpose hardware-based systems that perform the specified functions or acts, or combinations of special-purpose hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for controlling operation of a vehicle, wherein the vehicle includes a telematics device, a GPS tracking device, and a multi-position driver's seat including a seat position actuator that is operatively connected to a seat controller that is disposed to control a position setting thereof, the method comprising:
   receiving an alert of an impending traffic event;
   determining a desired activation command for the seat position actuator based upon the impending traffic event;
   controlling, via the seat controller, the seat position actuator responsive to the desired activation commands;
   monitoring ground speed of the vehicle; and
   repeating the activation of the seat position actuator when there is no discernible reduction in the ground speed of the vehicle.

2. The method of claim 1, wherein the desired activation command for the seat position actuator comprises a periodic waveform having repetitively executed commands each defined by a magnitude, a hardness, a pitch and a duration.

3. The method of claim 2, wherein the periodic waveform having repetitively executed commands each defined by magnitude, hardness, pitch and duration is selected to haptically simulate a desired road surface at the driver's seat.

4. The method of claim 3, wherein the desired road surface at the driver's seat comprises a plurality of rumble strips.

5. The method of claim 1, wherein the seat position actuator comprises a first actuator disposed to adjust a longitudinal position of the driver's seat.

6. The method of claim 1, wherein the seat position actuator comprises a second actuator disposed to adjust an elevation position of the driver's seat.

7. The method of claim 1, wherein the seat position actuator comprises a third actuator disposed to adjust a rotational position of a seat back relative to a lower seat member of the driver's seat.

8. The method of claim 1, wherein the seat position actuator comprises a fourth actuator disposed to adjust a rotational position of the driver's seat relative to a floor pan of the vehicle.

9. The method of claim 1, wherein the seat position actuator comprises a fifth actuator disposed to adjust a lumbar support position of the driver's seat.

10. The method of claim 1, wherein the seat position actuator comprises a combination of a first actuator disposed to adjust a longitudinal position of the driver's seat, a second actuator disposed to adjust an elevation position of the driver's seat, a third actuator disposed to adjust a rotational position of a seat back relative to a lower seat member of the driver's seat, a fourth actuator disposed to adjust a rotational position of the driver's seat relative to a floor pan of the vehicle and a fifth actuator disposed to adjust a lumbar support position of the driver's seat.

11. The method of claim 1, wherein the telematics device is disposed to effect one of vehicle-to-vehicle (V2V) communication and vehicle-to-infrastructure (V2I) communication; and wherein receiving the alert of the impending event is communicated to the vehicle via one of the V2V and the V2I communications.

12. The method of claim 1, wherein the vehicle further comprises an on-vehicle spatial sensor, and wherein receiving the alert of the impending traffic event comprises receiving the alert via the on-vehicle spatial sensing device.

13. The method of claim 1, wherein the vehicle further includes an HMI device in communication with an auditory speaker; the method further comprising generating, via the auditory speaker, an audible sound that is analogous to the desired activation command for the driver's seat.

14. The method of claim 13, further comprising communicating, via the HMI device, a detail associated with the impending traffic event.

15. The method of claim 1, wherein the vehicle further includes an HMI device in communication with a visual display device, the method further comprising generating, via the visual display device, a visual display coincident with the desired activation command for the driver's seat.

16. The method of claim 1, further comprising determining intensity of the desired activation command for the seat position actuator based upon proximity of the vehicle to the impending traffic event and a magnitude of traffic complexity.

17. The method of claim 1, wherein the factors associated with the controlled activation of the seat actuators is dependent upon the type of the impending traffic event, wherein the impending traffic event includes one of presence of a pedestrian, a bicycle, a slow moving vehicle, presence of an accident, and presence of a disabled vehicle near a trajectory of the vehicle.

18. The method of claim 1, wherein determining the desired activation command for the seat position actuator based upon the impending traffic event comprises determining a magnitude, a hardness, a pitch and a duration of the activation command based upon a magnitude of traffic complexity and a distance and speed to the impending traffic event shown.

19. A vehicle, comprising:
   a telematics device;
   a multi-position driver's seat including a seat position actuator; and
   a seat controller operatively connected the seat position actuator and in communication with the telematics device, the seat controller including an instruction set, the instruction set executable to:
      receive, via the telematics device, an alert of an impending traffic event;
      determine a desired activation command for the seat position actuator based upon the impending traffic event;
      control the seat position actuator responsive to the desired activation command;
      monitor ground speed of the vehicle; and
      repeat the activation of the seat position actuator when there is no discernible reduction in the ground speed of the vehicle.

20. The vehicle of claim 19, wherein the desired activation command for the seat position actuator comprises a periodic waveform, wherein the periodic waveform includes a plurality of repetitively executed commands each defined by magnitude, hardness, pitch and duration that are selected to haptically simulate a road surface comprising rumble strips at the driver's seat.

* * * * *